*INVENTORS*
KARL LAUER
GEORG STOECK

United States Patent Office 3,539,505
Patented Nov. 10, 1970

3,539,505
LARGE-SCALE COLUMN CHROMATOGRAPHY PROCESS AND APPARATUS THEREFOR
Karl Lauer, Schriesheim, and George Stoeck, Mannheim-Waldhof, Germany, assignors to Boehringer Mannheim G.m.b.H., Mannheim, Germany, a corporation of Germany
Continuation-in-part of application Ser. No. 552,934, May 25, 1966. This application Oct. 22, 1968, Ser. No. 769,666
Claims priority, application Germany, June 3, 1965, B 82,245
Int. Cl. B01d *15/08*
U.S. Cl. 210—31                                     28 Claims

ABSTRACT OF THE DISCLOSURE

A method and apparatus for carrying out large scale column chromatography of liquids according to which the disturbances arising in large scale column chromatography due to "distorted running" of the fronts is avoided by radially mixing the axially flowing liquid in the column in small mixing spaces arranged at predetermined intervals along the length of the column.

---

This application is a continuation-in-part of application Ser. No. 552,934 filed May 25, 1966 and now abandoned.

The present invention is concerned with a process and apparatus for carrying out column chromatography on a large scale. More particularly this invention is concerned with a process and apparatus for carrying out liquid column chromatography on a large scale.

In recent years, column chromatography has become a conventional laboratory method for use in the purification and separation of materials. When attempts are made to use this method on a large scale, a number of difficulties arise which have heretofore rendered the advisability and practicability of large scale column chromatography questionable. Particularly serious difficulties arise with increasing length and diameter of the columns, by the "distorted running" of the fronts which lead to a poor utilization of the column capacity, and, especially in the case of low separation factors, to the impossibility of adaptation to large scale separation of the multi-component liquid.

The "distorted running" of the fronts is due to a great variety of different factors, such as non-uniform filling of the column, variations in temperature, viscosity and volume, canal formation, greater ease of flow between the column filling and the inner wall of the column, and the like. As has been established through experience, this "distorted running" cannot be avoided even when proceeding very carefully. Thus, whereas in the ideal case, the concentration time diagram of a liquid which has passed through a chromatographic column represents a more or less steep bell-shaped curve, in the case of columns used for large-scale chromatography, this diagram degenerates into completely irregular drawn-out shapes.

This invention has as an object a simple and practical method for carrying out liquid column chromatography on a large scale.

A further object of the invention is an apparatus for this purpose, i.e., applicable to carrying out liquid column chromatography on a large scale.

A still further object of the invention is a method and apparatus for accurately carrying out large-scale column chromatography, i.e., separating multi-component liquids into its components.

In accordance with the invention, it has now been found that these objects are accomplished and the disturbances arising in large-scale column chromatography due to the "distorted running" of the fronts avoided by radially mixing the axially flowing liquid in the column in small spaces arranged at predetermined intervals along the length of the column.

Concentration time diagrams obtained by analysis of multi-component liquids which have passed through a column constructed in accordance with the invention so as to provide for radially mixing of the axially flowing liquid at designated intervals along the column's length correspond to an almost ideal, steep, bell-shaped curve. Thus, the separation and purification effects which are observed in the considerably smaller dimensioned laboratory chromatography columns are also obtained in large scale operations and apparatus when processing according to the present invention.

This result is entirely unexpected and was not to have been foreseen as all radial mixing is automatically bound up with an axial mixing (return mixing). This return mixing invariably brings about a deterioration of the degree of separation achieved with the column and, in addition, leads to a flattening out of the concentration-time diagram. Thus, generally, an attempt is made to avoid return mixing and to keep it as low as possible. However, in the process according to the present invention, the radial mixing carried out at definite, i.e., predetermined distances leads, surprisingly, to a straightening out of the front and to such an increase in the performance of the column that the return mixing effect is no longer of importance.

The distances at which the radial mixing is to be carried out in the process according to the present invention are, in the main, independent of the column's diameter.

The mixing zones are advantageously located at distances of between 0.5 and 2 meters from one another and preferably are located at distances of 0.75 to 1.2 meters from one another. The height of the mixing zones is also independent of the column's diameter and advantageously amounts to from 1 to 5 cm. and preferably 2 to 3 cm.

In addition, the nature and particle size of the adsorption agent, the velocity of flow of the liquid phases and the specific separation factors are of importance. In practice, the optimum distances are determined empirically. If the distance between two mixing zones is too great, then disturbances due to "distorted running" of the fronts will take place. If, on the other hand, the distances are too small, then the elution curves are noticeably flattened, especially when the volumn of the mixing zones is too great in relation to the volume of the separation zones.

For a better understanding of the present invention, reference will be made to the accompanying drawings in which.

Figure 3A:
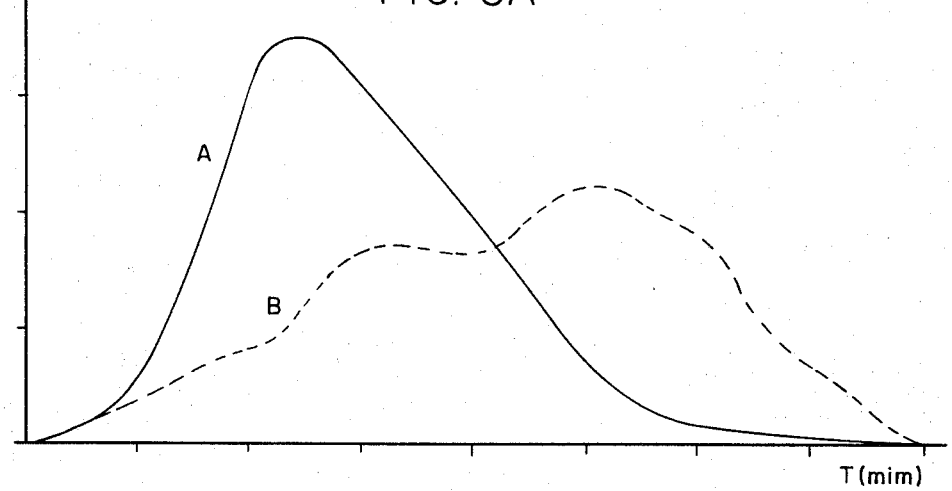
Figure 3B:
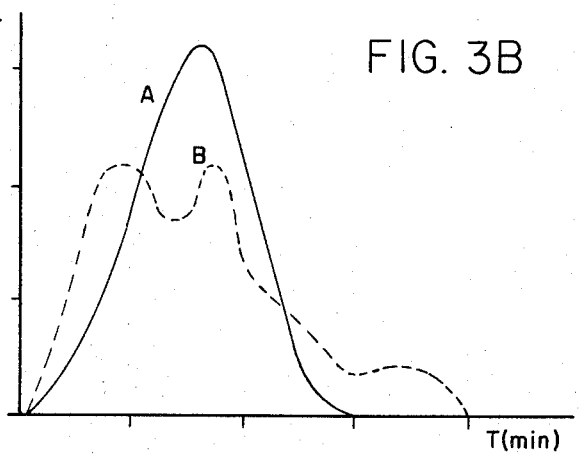
Figure 3C:
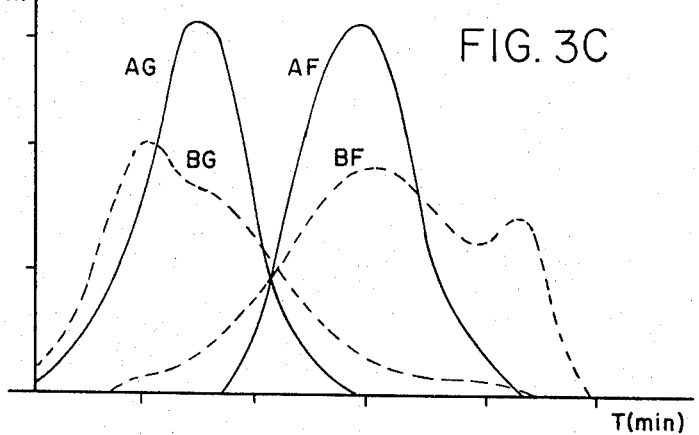

FIGS. 3a to c show concentration-time diagrams obtained according to the present invention and with conventional processes.

For carrying out the process according to the present invention, one or more pairs of sieve plates are incorporated into a column and a radial mixing of the eluting agent takes place in the zone between the two sieve plates forming each pair. In the case of two or more pairs of sieve plates, the pairs are spaced apart. The adsorption agent in the column is kept out of the mixing zone or zones by the sieve plates. The eluting agent, after having been mixed in the mixing zone flows uniformly through the lower sieve plate of the pair of sieve plates into the next separation zone of the column.

Figure 1:
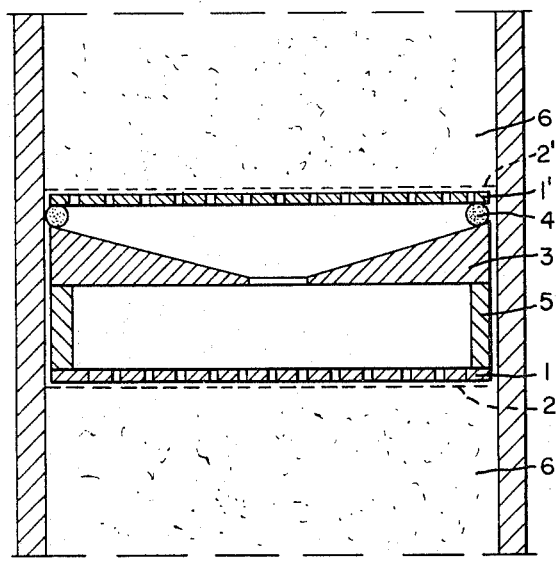
FIG. 1 shows one embodiment of a device for carrying out the process according to the present invention.
Figure 1A:
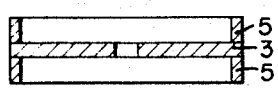
FIG. 1a shows in detail a part of a device for carrying out the process according to the present invention.
Figure 1B:
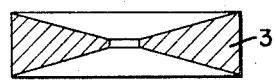
FIG. 1b shows in detail a part of a device for carrying out the process according to the present invention.

Generally, the mixing which automatically takes place in the zone between the two sieve plates of a pair suffices to produce satisfactory results. However, in the case of really large column diameters, this automatic radial mixing alone is not sufficient and, therefore, it is advantageous in these instances to provide, between the sieve plates of each pair, a device which ensures a thorough mixing of the liquid in the zone established between the two sieve plates of a pair. As mixing devices for this purpose, there are suitable, for example, mechanically-driven stirrers, magnetic stirrers, vibrators, ultrasonic devices and the like, the choice of the possible and preferable mixing device depending in each instance, of course, on the dimensions and structural material of the column. In actual practice, one embodiment of the invention in which a centering plate 3 is arranged between a pair of sieve plates 1 and 1' has proved to be particularly expedient. This embodiment has the particular advantage, that, with structurally simple means which do not require supervision, a thorough radial mixing is ensured. Two instances of constructions of such centering plates are shown in FIGS. 1a and 1b of the accompanying drawings. In the case of a very large column diameter, it may also prove advantageous to mount a distribution head below the centering plate.

A radial mixing can also be achieved, with or without the use of the centering plate by utilizing an arrangement wherein the openings in the sieve plates are not parallel to the axis thereof but rather are positioned at an angle to the axis so that fluid flowing through the openings tends to rotate about the axis of the sieve plate. With a suitable thickness of the sieve plate and a sufficient angle of the openings, by the rotation of the column of liquid between the two sieve plates there is ensured a sufficient mixing and a uniform impinging of the liquid over the whole of the lower sieve plate.

The incorporation of the sieve plates into the column can be achieved by flanging, that is, by constructing a column from a plurality of short columns joined together by pairs of sieve plates of the above-described type. However, it has proved to be especially advantageous to use one long column unit and to insert therein one or more combinations each comprising a pair of sieve plates and preferably also a centering plate. These combinations (two sieve plates and possibly a centering plate) can be moved axially into any desired position and are held in place by various means as, for example, by an annular gasket 4. Furthermore, these combinations can be provided with one or two annular distance pieces or spacers 5, dimensioned so that their outer diameter is somewhat less than the inner diameter of the column, in order to combine these combinations to form a single unit. This preferred constructional form of the device according to the present invention can be inserted at any desired position in the column. Consequently, a column which has already been set up, in this manner, can be adapted quickly and easily to the prevailing conditions resulting, for example, from the nature of the adsorption agent, the flow-through rate and the like, so that it is always possible to work under optimum conditions. In the case of the use of column fillings which swell considerably and, depending on the degree of charging, undergo considerable changes in volume (e.g., ion exchangers), it is recommended only to draw on the compressible annular gasket to such an extent that adsorption agent and elution liquid cannot flow past the sieve plate combinations around the edges thereof. It is then possible for these combinations to be moved axially in the column corresponding to the changes in volume of the column filling.

Each sieve plate generally comprises a plate 1 containing holes and covered with a fine metallic or synthetic resin gauze or mesh 2 which is not subject to attack by the elution agent, the mesh being arranged on that side of the sieve plate which is adjacent to the column filling. The openings in the plate must be of such a size that the elution agent can pass through them without encountering too much resistance but cannot be too large in order that the mesh 2 is not subjected to very considerable mechanical stresses. Opening diameters of 2–15 mm., preferably of 5–6 mm., have proved to be particularly useful. The strength and mesh size of the meshes to be used depend upon the particle size of the adsorption agent used and, therefore, can be varied considerably. Mesh sizes of 0.02–1 mm., preferably 0.1–0.2 mm., have been very successfully used. However, the dimensions of the perforated plates, of the openings in these plates and of the meshes must be so chosen that the adsorption agent cannot pass through and that the sieve plates do not become blocked up. In addition, of course, the sieve plates as a whole must be capable of withstanding, without bending, the pressure load of the column filling, including the pressure due to the flow-through of the elution liquid.

The dimensions of the mixing zones according to the present invention as noted above do not directly depend upon the inner dimensions of the column and are advantageously 1 to 5 cm. in height and are located 0.5 to 2 meters apart. Clearly the distance between the two sieve plates should be as small as possible in order to avoid unnecessary remixing, but they must be large enough to ensure complete axial mixing. When using sieve plates wherein the openings in the sieve plates are not parallel to the axis thereof but rather are positioned at an angle up to some 50°, axial mixing is established in a smaller area and the distance between the sieve plates of each pair can be reduced.

The material used in the construction of the mesh according to the present invention depends on the solvent and the absorption agents as used within this process. Materials such as polyvinylidene chloride, polypropylene, nylon, Perlon, Teflon, nickel-plated wire mesh and stainless steel mesh can be used with good success.

The material of the gasket is used according to the present invention can be chosen from the broad range of compressible materials which are not affected by the eluting agent and include, for example, rubber synthetic rubber, silicon, and Teflon.

The optimum distances between any two mixing zones, i.e., the location of the mixing zones in the column is comparatively independent of the column diameter and advantageously is chosen so that the mixing zones are located at distances one from the other at distances of 0.5 to 2 meters and preferably at distances of 0.75 to 1.2 meters. The dimensions, i.e., height of the mixing zones is also almost completely independent of the column diameter and advantageously amounts to from 1 to 5 cm. and preferably from 2 to 3 cm. in height. The installation, i.e., the fastening of the individual mixing zones into columns having fairly large diameters is preferably carried out by screwing the mixing elements to the wall through narrow consoles fastened to the inner walls of a column. In order to enable the installation and removal of the mixing elements from the column, the elements are formed with corresponding grooves which, if desired, can be sealed prior to operation of a column. The sealing of the individual zones to the column wall is preferably carried out by constructing the mixing elements with conically tapering walls. Sealing rings are then installed and held through the conically tapering walls of the mixing zone section in close abutting contact with the abutting wall.

Figure 2:
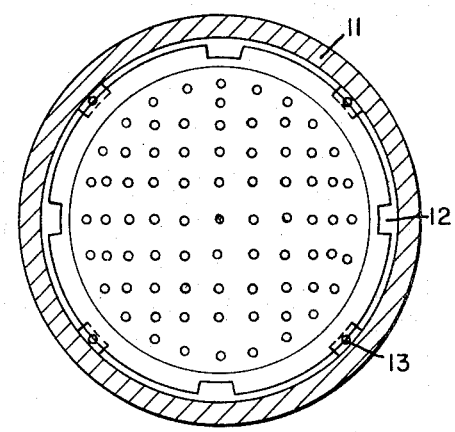
FIG. 2 shows in detail a preferred form of inserting a mixing zone into the column according to the present invention.
Figure 1C:
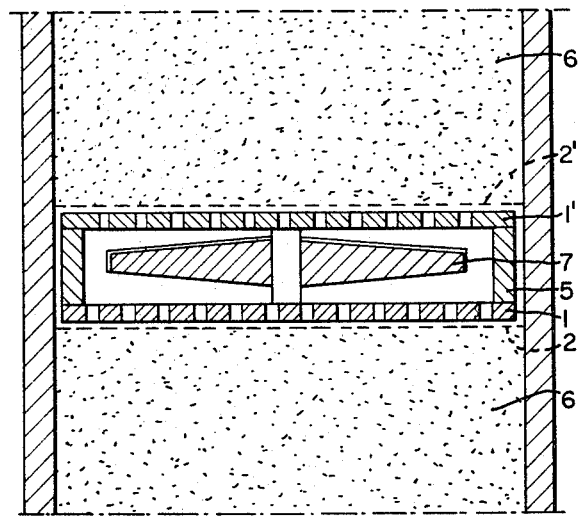
FIG. 1c shows in detail the deployment of a mixing means 7 within a space defined by upper and lower sieve plates.
Figure 2A:
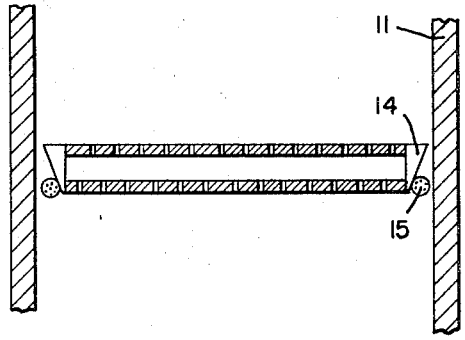
FIG. 2a shows another view of the construction of FIG. 2.

In FIGS. 2 and 2a, such a construction has been illustrated. In the drawings the reference numeral 11 designates the column which carries on its inner walls, narrow consoles 13 which are provided with notches 12 for joining to the coresponding grooves formed on the mixing elements. The individual mixing elements are constructed so as to be conically tapered and are maintained in a tight sealed relationship with the column wall through sealing ring 15, the sealing ring 15 being held in tight impenetrable relationship between the conically tapered wall 14 of the mixing element and inner wall of the column 11.

Utilizing the process and means according to the present invention, it is possible to carry out on a large scale by means of column chromatography, purifications and separations which have hitherto only been carried out on a laboratory scale, as separation of difficult or impure dyes, sugars, amino acids, rare earth metal ions, steroids, alkaloids, optical isomers and other mixtures of closely related liquid substances, which lend themselves to separation in the laboratory by means of column chromatography.

As column fillings there can be used any of the conventional materials, such as silicic acids, aluminum oxides, cellulose powders, activated carbon and chalk, as well as various kinds of anionic and cationic exchange resins. Typical examples of such absorption agents are neutral basic and acid alumina, such as granular gamma alumina, having a particle size of 50–200 mesh and a surface area of 100 to 300 m.$^2$/g., carbons and charcoals having a particle size of 20–270 mesh and having surface areas of 100–1700 m.$^2$/g., silicic acids having a particle size of 20–200 mesh and surface areas of 100–4000 m.$^2$/g., and cationic and anionic exchange resins in the H$^+$, OH$^-$, or in the salt form having particle sizes of 20–400 mesh.

The flow rate of the liquid eluent in column chromatography depends on the viscosity, the particle size of the absorption agent, and the difference in pressure involved. The particle size of the column fillings and the pressure should be chosen such that flow rates of 0.5–5 ml./cm.$^2$/min. are maintained as it is known to the artisan that at such flow rates good separation effects are obtained.

The term "radially" as used herein is intended to mean at right anges to the axis of the column and is also intended to include equatorial movements.

In the following examples, which are given only for the purpose of illustrating the present invention, there is described, in more detail, the new process and the apparatus preferably to be used in connection therewith. Furthermore, the superiority of the new process over the previously used processes is shown by means of comparative runs.

EXAMPLE 1

(A) Run according to the invention

A chromatographic column having a length of 8 meters and an internal diameter of 150 mm., was filled with an aqueous slurry of a cationic exchanger in the H$^+$ form ("Dowex" 50 Wx 4). ("Dowex" is a registered trademark for a sulfonated polystyrene-divinyl bezene-resin). After charging into the column that amount of slurry which filled 1 meter of the column there was inserted into the column a unit which consisted of two perforated plates 1 and 1', having a plate diameter of 145 mm., and a perforation diameter of 6 mm., each plate being covered over with a synthetic resin mesh 2 and 2', prepared from polyvinylidene chloride or polypropylene, and having a mesh size of 0.1 mm. A centering plate 3 having a 145 mm. diameter was arranged between the perforated plates 1 and 1'. Between the lower perforated plate 1 and the centering plate 3 there was arranged an annular spacing piece 5 having a diameter of 145 mm. and a height of 60 mm. Between the centering plate 3 and the upper perforated plate 1' there was arranged an annular gasket 4 (see FIG. 1). During the filling of the column with the slurry, care was taken that the exchanger was always covered with water and that no air bubbles were entrapped.

Two liters of an aqueous dyestuff solution (high molecular weight dyestuff based on polydextran, not irreversibly bound by the ion exchanger and known under the trade name "Blue Dextran 2000") was introduced into the column and eluted with water at a velocity of 18–20 liters/hour. The fractions emerging from the lower end of the column were continuously analyzed photometrically for their dyestuff content. The values obtained were plotted as a concentration-time diagram which had the form of an almost ideal bell-shaped curve (see FIG. 3, I, A).

(B) Comparative run

The same column was used as in (A) and was charged with an aqueous slurry of the same ion exchanger but without the insertion of the construction for mixing according to the present invention. The same amount of dyestuffs was eluted under identical conditions using water as the eluting agent, and the dyestuff content of the recovered fractions again plotted as a concentration-time diagram (see FIG. 3, I, B).

From this diagram it can be seen that in the case of the known process, the dyestuff was eluted from the column very irregularly due to the distorted fronts, whereas the radial mixing at intervals along the column according to the present invention overcomes this fault.

EXAMPLE 2

(A) Run carried out according to the invention

An exchanger column having a height of 8 meters and an internal diameter of 150 mm. enclosed by a heating jacket, was charged with a cationic exchanger in the calcium form ("Dowex" 50 Wx 4). A device of the type described in Example 1(A) was inserted after each 1 meter of column filling. However, in contradistinction to Example 1, the annular gasket was only drawn on to such an extent that each device could still be displaced axially in the column. The column was thermostatically heated with water to 60° C. and charged with 10 liters of 40% aqueous glucose solution. Elution was carried out with water at 60° C. at a rate of 18–20 liters/hour. The sugar-containing fractions emerging at the lower end of the column were analyzed and the values obtained were then plotted as a concentration-time diagram and showed the almost ideal form of a bell-shaped curve (see FIG. 3, II, A).

(B) Comparative run

Under the same conditions as described in Example 2(A), glucose was passed through an ion exchanger column heated to 60° C., but without the insertion of the mixing devices according to the present invention. The values obtained by analysis of the emerging sugar-containing fractions were also plotted (see FIGS. 3, II, B).

From this diagram it can be seen that, without the use of the devices according to the present invention, the sugar emerges from the column in a completely irregular manner, which is due to the distortion of the fronts.

EXAMPLE 3

(A) Run carried out according to the invention 10 liters of a 50% invert sugar solution were passed into a heated exchanger column constructed in the manner described in Example 2(A) and thereafter the column's contents were eluted with warm water. The emerging fractions were separately analyzed for glucose and fructose. The results obtained are shown in FIG. 3, III (curves AG and AF).

As can be seen from the diagram, the glucose and fructose were substantially separated from one another; both elution curves having a bell-shaped form.

(B) Comparative run

In this experiment, 10 liters of invert sugar solution were separated in an ion exchanger column in a manner analogous to that described in Example 3(A) but without the use of the devices in accordance with the present invention. The two sugars emerging from the lower end of the column were non-uniformly and substantially less effectively separated from one another (see FIG. 3, III curves BG and BF).

EXAMPLE 4

A chromatographic column having a length of 12 meters and an internal diameter of 500 mm., was filled with an aqueous slurry of a cationic exchanger in the calcium form ("Dowex" 50 Wx 4). After charging into the column that amount of slurry which filled 0.75 meter of the column there was inserted into the column a unit which consisted of two perforated plates 1 and 1', having a plate diameter of 495 mm., and a perforation diameter of 6 mm., each plate being covered over with a synthetic resin mesh 2 and 2', prepared from polyvinylidene chloride or polypropylene, and having a mesh size of 0.1 mm. A centering plate 3 having a 495 mm. diameter was arranged between the perforated plates 1 and 1'. Between the lower perforated plate 1 and the centering plate 3 there was arranged an annular spacing piece 5 having a diameter of 495 mm. and a height of 50 mm. Between the centering plate 3 and the upper perforated plate 1' there was arranged an annular gasket 4 (see FIG. 1). During the filling of the column with the slurry, care was taken that the exchanger was always covered with water and that no air bubbles were entrapped.

The column was thermostatically heated with water to 60° C. and charged with 200 liters of 50% invert-sugar solution. Elution was carried out with water at 60° C. at a rate of 200 liters/hour. The sugar-containing fractions emerging at the lower end of the column were analyzed and the values obtained were then plotted as a concentration-time diagram and showed a similar curve as shown in FIG. 3, III (curves AG and AF).

Already after each four hours further 200 liters of invert-sugar solution were passed into the column and then eluted with warm water. Several thousand cycles were run in this way and showed a nearly complete separation of the glucose and fructose.

EXAMPLE 5

In the same way, as shown in Example 4, an exchanger column having a height of 15 meters and a diameter of 1200 mm., was charged with a cationic exchanger in the calcium form ("Dowex" 50 Wx 4). A device of the type described in Example 4, however, fitting to the bigger diameter of this column, was inserted after each one meter of column filling. The column was thermostatically heated with water to 60° C. and charged with 1000 liters of a 50% invert-sugar solution. Elution was carried out with water at 60° C. at a rate of 1000 liters/hour. Already after each 5 hours further 1000 liters of invert-sugar solution are charged without disturbing the separation of glucose and fructose to the wanted extent. A factory with column diameters of 3000 mm. and with distances between the devices according to this invention of 1 to 1.2 meters is under construction and is planned to separate about 500 tons of invert sugar monthly.

We claim:

1. Process for carrying out large-scale column chromatography in a chromatographic column containing a plurality of zones filled with separatory material, each of said zones being separated from the next adjacent zone by a radial mixing zone having a length which is comparatively small as compared to the length of the zones filled with separatory material, each of said mixing zones comprising an obstructed passage, said obstruction enhancing the radial mixing effect, said method comprising introducing a liquid stream, said liquid stream being the sole feed stream into said column, into the first of said zones filled with separatory material so that the liquid stream flows axially through said zone, directly thereafter flowing said liquid stream through said mixing zone to induce non-axial directional flow and substantial radial mixing of the liquid stream moving axially through the column, directly thereafter flowing the mixed liquid stream through a second zone filled with separatory material and withdrawing the components of the liquid stream from the column.

2. A process according to claim 1 wherein said radial mixing zones are arranged in said column at a distance from one another amounting to 0.5 to 2 meters.

3. A process according to claim 1 wherein said radial mixing zones are arranged in said column at a distance from one another amounting to 0.75 to 1.2 meters.

4. A process according to claim 1 wherein said radial mixing zones each has a height of from 1 to 5 cm.

5. A process according to claim 1 wherein said radial mixing zones each have a height of from 2 to 3 cm.

6. A process according to claim 1 wherein said column is filled with a member selected from the group consisting of silicic acid, aluminum oxide, cellulose powder, activated charcoal, chalk, anionic exchange resins, and cationic exchange resins.

7. A process according to claim 1 wherein said mixing is effected by mechanical means.

8. Apparatus for carrying out large-scale liquid column chromatography comprising an elongated chromatographic column filled with an adsorption agent having arranged therein at least one unit for radially mixing a liquid flowing axially through said column, said unit comprising an upper and lower sieve plate perforated substantially throughout their surfaces and defining therebetween an unobstructed space wherein said radial mixing of axially flowing liquid can take place, means provided in said space for facilitating said mixing the sole inlet means provided in said column being an aperture near the top thereof, an outlet means provided in said column, said mixing unit being substantially free of adsorption agent and being arranged in said column intermediate said inlet means and outlet means.

9. Apparatus according to claim 8 wherein said means for facilitating said mixing is a centering plate.

10. Apparatus according to claim 9 wherein a distribution head is arranged below said centering plate.

11. Apparatus according to claim 8 wherein said means for facilitating said mixing is a centering plate, said centering plate dividing said space into two successively arranged chambers in direct communication with each other through said centering plate and wherein said mixing takes place in said second chamber.

12. Apparatus according to claim 8 wherein each pair of sieve plates is held in position by an annular gasket.

13. Apparatus according to claim 12 wherein said annular gasket is adjustable.

14. Apparatus according to claim 8 wherein the openings in said sieve plates have a diameter of 2 to 15 mm.

15. Apparatus according to claim 8 wherein the side of the sieve plate which is adjacent to said adsorption agent has applied thereover a synthetic resin mesh.

16. Apparatus according to claim 15 wherein the mesh has openings having a size of 0.02 to 1 mm.

17. Apparatus according to claim 8 wherein the side of the sieve plate which is adjacent to said adsorption agent has applied thereover a metallic mesh.

18. Apparatus according to claim 17 wherein the mesh has openings having a size of 0.02 to 1 mm.

19. Apparatus according to claim 8 wherein the openings in said sieve plate are arranged parallel to the axes of the sieve plates.

20. Apparatus according to claim 8 wherein the openings in said sieve plates are arranged at an angle to the axes of the sieve plates.

21. Apparatus according to claim 8 wherein said means for facilitating said mixing is a mechanically driven stirrer.

22. Apparatus according to claim 8 wherein said means for facilitating said mixing is a magnetic stirrer.

23. Apparatus according to claim 8 wherein said means for facilitating said mixing is a vibrator.

24. Apparatus according to claim 8 wherein said means for facilitating said mixing is an ultrasonic device.

25. Apparatus according to claim 8 wherein said column has arranged therein one radial mixing unit.

26. Apparatus according to claim 8 wherein said column has arranged therein a plurality of radial mixing units.

27. Apparatus for carrying out large-scale liquid column chromatography comprising an elongated chromatographic column filled with an absorption agent having arranged therein at least one unit for radially mixing a liquid flowing axially through said column, said unit comprising an upper and lower sieve plate perforated substantially throughout their surfaces and defining therebetween an unobstructed space wherein said radial mixing of axially flowing liquid can take place, the openings in said upper sieve plate being arranged at an angle to the axes of the sieve plates whereby the axially flowing liquid has imparted thereto a radial motion component, being radially mixed on introduction into said space, the sole inlet means provided in said solumn being an aperture near the top thereof, an outlet means provided in said column, said mixing unit being substantially free of adsorption agent and being arranged in said column intermediate said inlet meas and outlet means.

28. Process for carrying out large-scale column chromatography in a chromatographic column containing a plurality of zones filled with separatory material, each of said zones being separated from the next adjacent zone by a radial mixing zone having a length which is comparatively small as compared to the length of the zones filled with separatory material, which method comprises introducing a liquid stream, said liquid stream being the sole feed stream into said column, into the first of said zones filled with separatory material so that the liquid stream flows axially through said zone, directly thereafter flowing said liquid stream through said mixing zone to induce non-axial directional flow and substantial radial mixing of the liquid stream moving axially through said column by altering the direction of flow of said axially flowing liquid immediately prior to its entry into said mixing zone by directing the flow of said liquid at an angle to the axis of said column, directly thereafter flowing the mixed liquid stream through a second zone filled with separatory material and withdrawing the components of the liquid stream from said column.

References Cited

UNITED STATES PATENTS

| | | | |
|---|---|---|---|
| 3,230,167 | 1/1966 | Golay | 54—386 X |
| 3,334,514 | 8/1967 | Catravas | 55—386 X |
| 3,214,247 | 10/1965 | Broughton | 55—197 X |
| 3,310,932 | 3/1967 | Melpolder | 55—386 |

T. L. DeCESARE, Primary Examiner

U.S. Cl. X.R.

55—67